June 5, 1962 E. A. PHILLIPS 3,037,726
ENGINE BLAST ABSORBING FENCE
Filed July 2, 1959 5 Sheets-Sheet 3
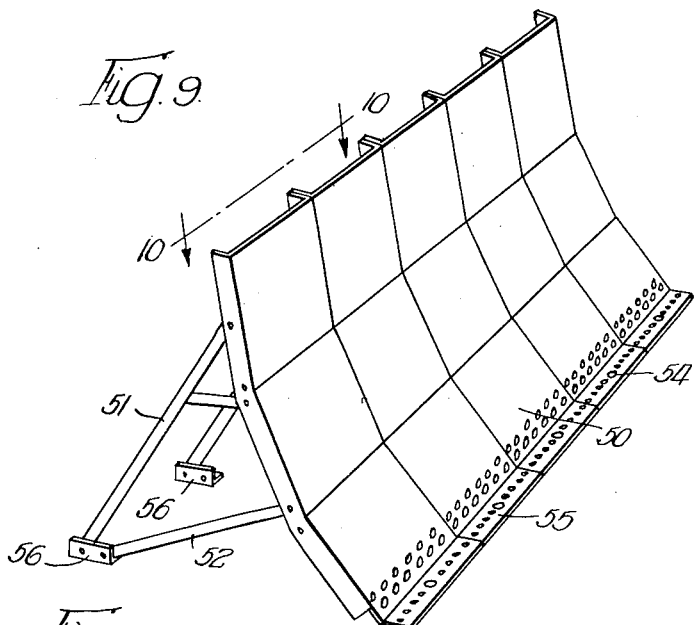
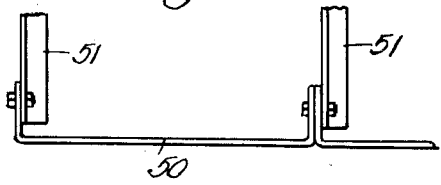
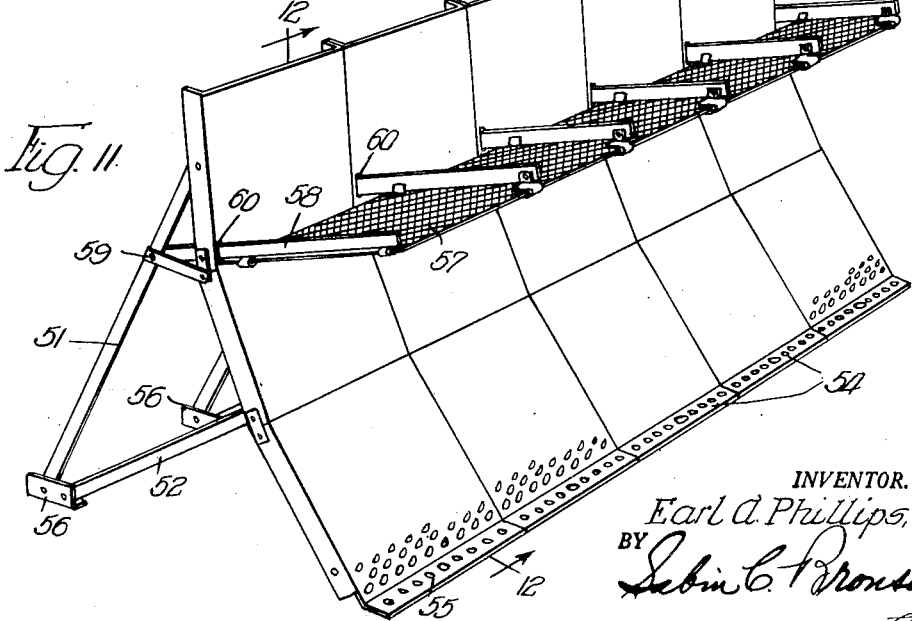
INVENTOR.
Earl A. Phillips,
BY June 5, 1962
E. A. PHILLIPS
3,037,726
ENGINE BLAST ABSORBING FENCE
Filed July 2, 1959
5 Sheets-Sheet 4
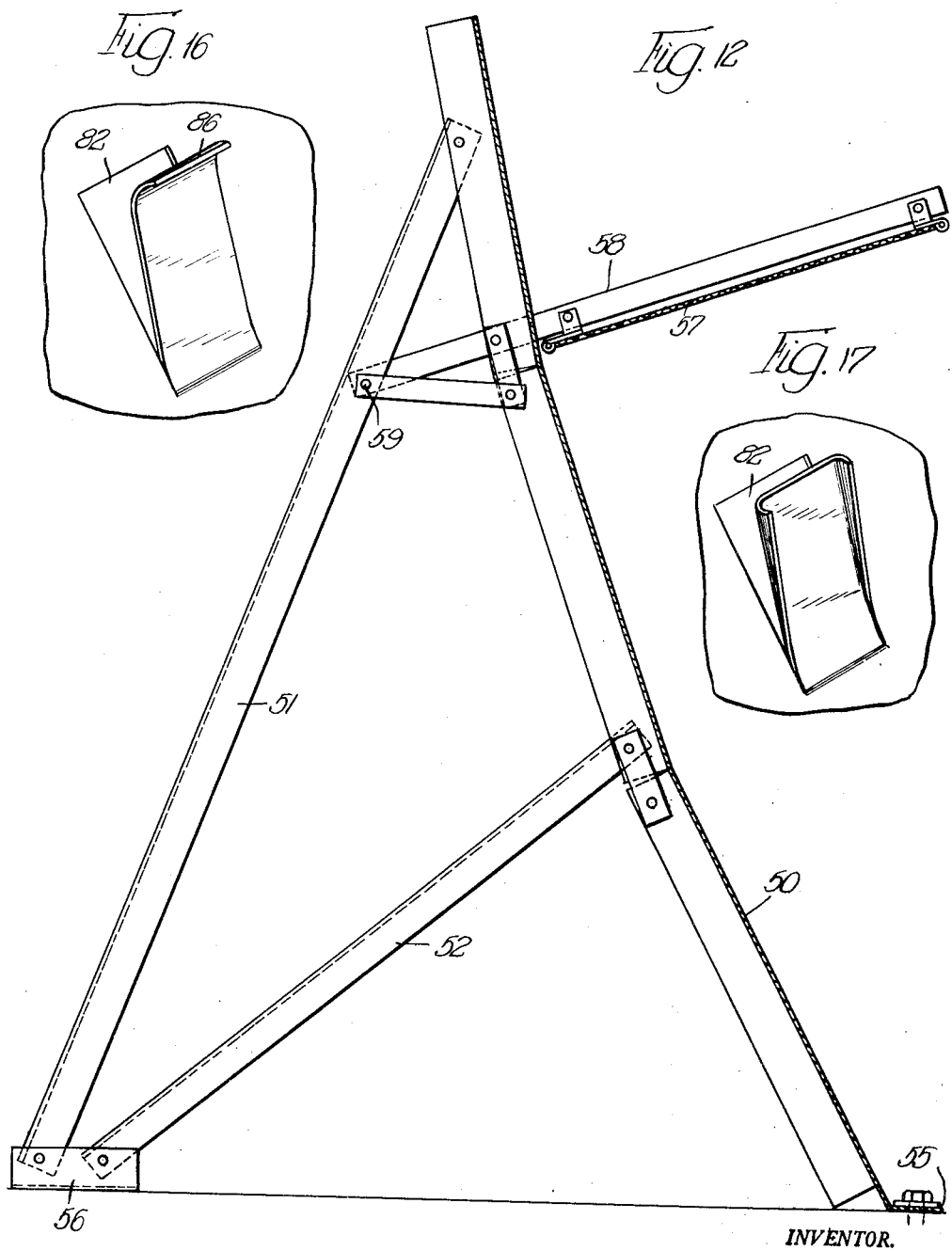
INVENTOR.
Earl A. Phillips
BY June 5, 1962  E. A. PHILLIPS  3,037,726
ENGINE BLAST ABSORBING FENCE
Filed July 2, 1959  5 Sheets-Sheet 5
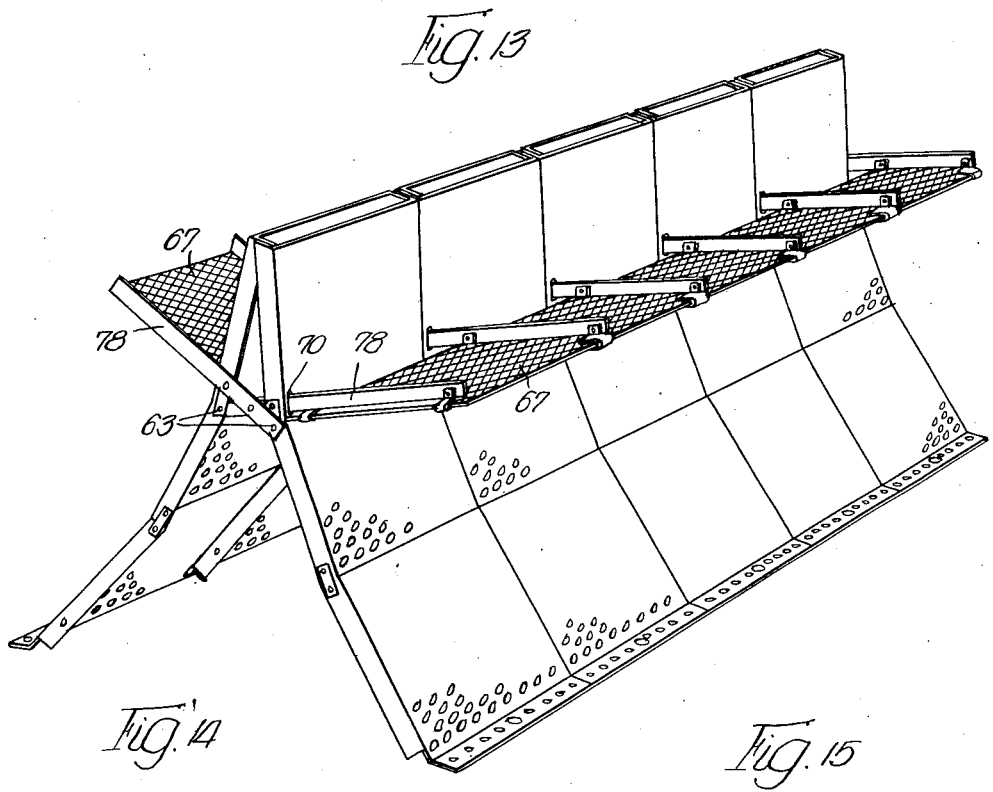
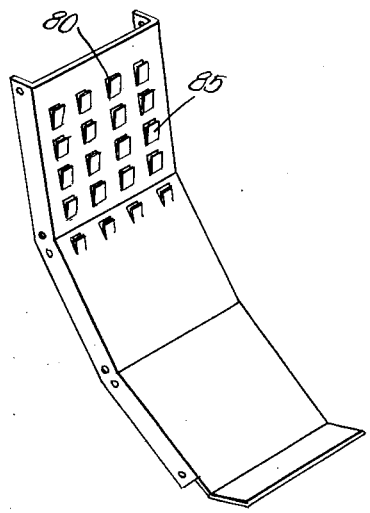
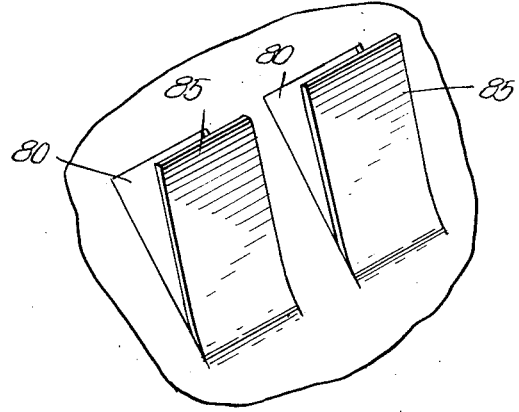
INVENTOR.
Earl A. Phillips
BY Sabin C. Bronson
ATTY

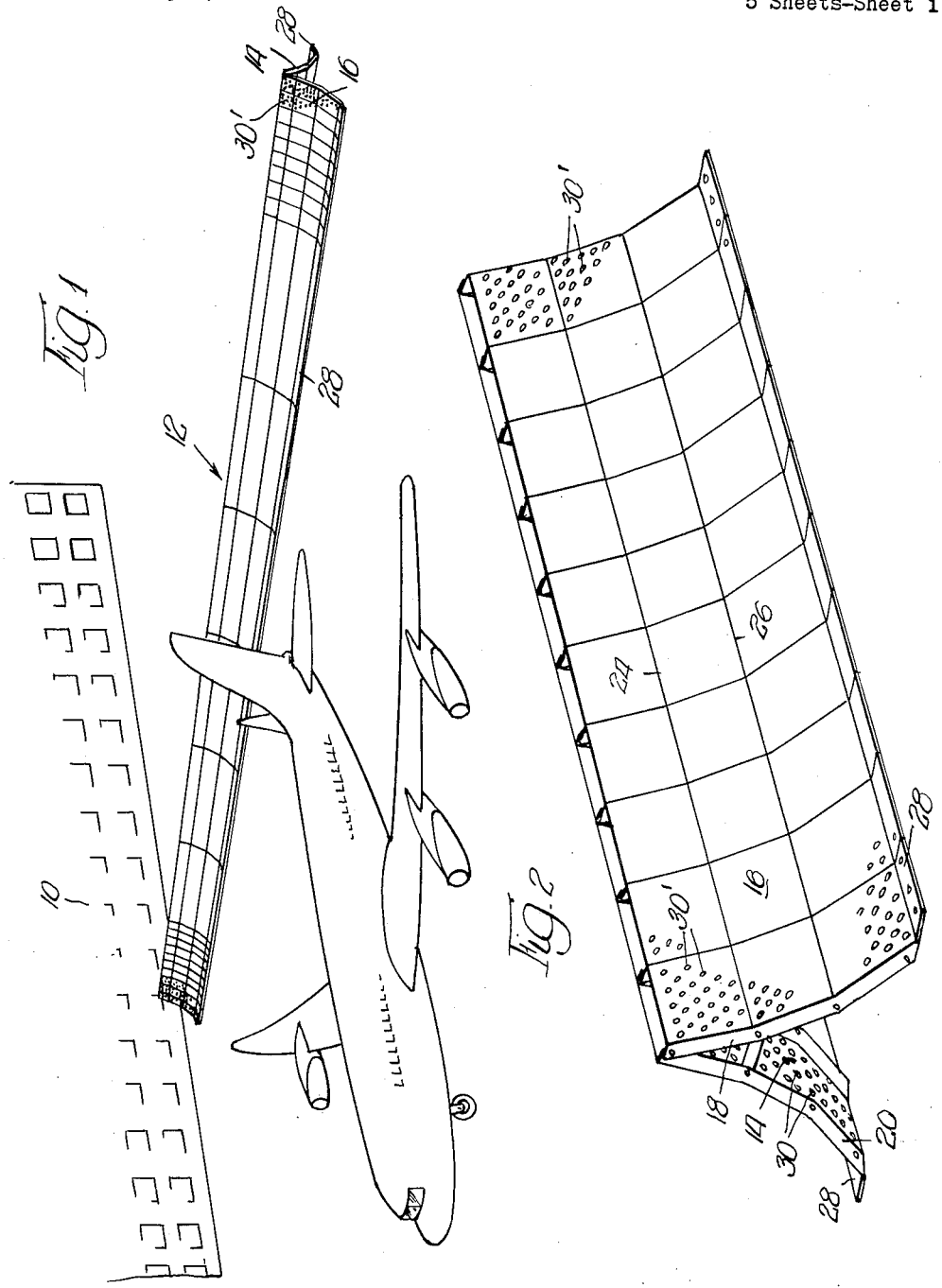

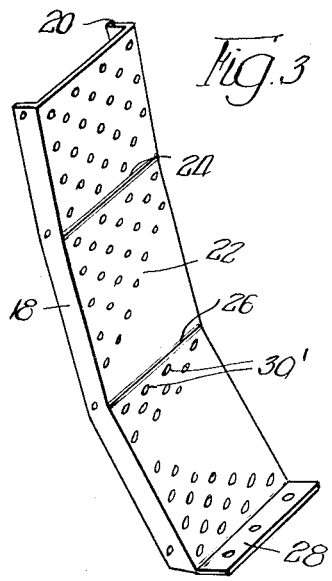
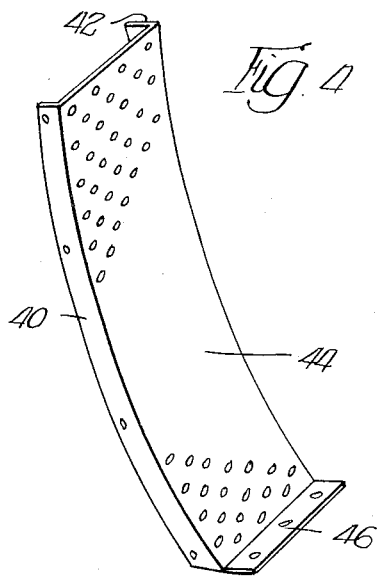
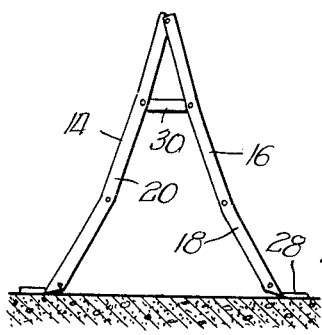
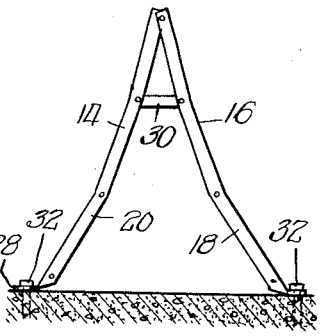
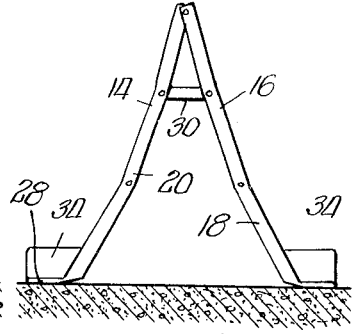
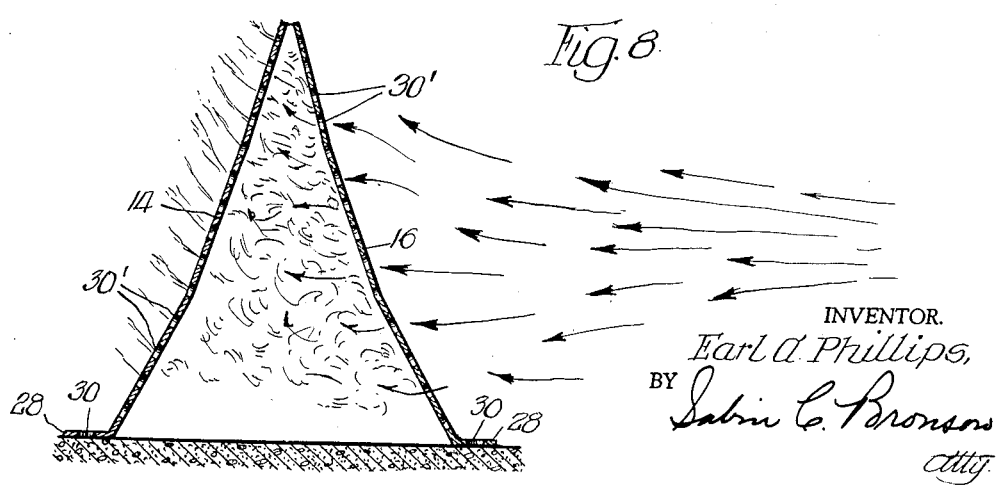

United States Patent Office 3,037,726
Patented June 5, 1962

3,037,726
ENGINE BLAST ABSORBING FENCE
Earl A. Phillips, La Grange Park, Ill., assignor to Stanray Corporation, Chicago, Ill., a corporation of Delaware
Filed July 2, 1959, Ser. No. 824,556
9 Claims. (Cl. 244—114)

This invention relates to an improved blast fence. The rapid development of jet engines for use in aircraft has posed many problems. Whenever such aircraft move under their own power around maintenance and passenger terminal areas, or whenever engine tests or warmups are conducted, high velocity air blasts of high temperature are exhausted from such engine causing extremely hazardous conditions to persons and equipment in the immediate vicinity behind said aircraft.

Furthermore, such blasts from jet engines have been known to pick up various and sundry pieces of debris and hurl them into the air behind the aircraft. Jet engines are vulnerable to dust, dirt, and other objects which may be pulled into their intakes. Thus an air blast from one jet engine may cause objectionable matter to be hurled toward the intake of another such engine to the detriment of the latter.

Various types of deflectors and deflector fences have been devised and tested by aircraft manufacturers and others in an effort to obviate the problem, but all that seems to have been accomplished thus far has been to redirect the blast upward and rearward without much effect on the velocity of the blast.

This invention relates to a blast fence constructed of simple modular units which, in their several modifications of form, are capable of being arranged in many configurations, some of which absorb part of the blast, thereby reducing the velocity of portion of the blast flowing upward and rearward of the fence.

It is one object of the present invention to provide a perforated double-walled blast fence which may be located in and transversely of the path of the exhaust blast from a jet engine, and which will break up the blast and direct some of it upwardly and rearwardly, and some of it through openings in the fence, thereby causing a turbulence between the walls of the fence which will dissipate the force of the blast and allow it to harmlessly escape. The dimensions of the fence should be so that the upper edge, when in operative position, will be at a level higher than the objects behind it which are to be protected.

Another object of the invention is to provide a fence that in addition to deflecting the blast, also serves as a partial sound barrier, particularly with respect to the high frequency sound waves emanating from the jet engine compressors. This is the most irritating noise to the human ear.

Still another object of the invention is to provide single sheet modular units which can be joined together in many ways to meet various individual application requirements for the invention.

A further object of the invention is to provide a fence built up of single sheet modular units through which a degree of visibility exists.

A still further object of the invention is to provide means associated with the fence to trap any debris which the force of the jet engine blast may blow up the fence, if such proves desirable in certain installations.

Other objects and advantages of the invention will appear in the following description thereof.

Referring now to the accompanying drawings, forming part of this application, and wherein like reference characters indicate like parts.

FIG. 1 is a perspective view of a portion of an air terminal building with an aircraft and the subject blast fence in one of its configurations in about the position it would be used.

FIG. 2 is a perspective view of a section of the blast fence, somewhat enlarged.

FIG. 3 is a perspective view of one of the perforated type blast fence units.

FIG. 4 is a view similar to FIGURE 3 but of a slightly modified form of blast fence unit.

FIG. 5 is an end elevation of FIG. 2 showing a completely portable fence, not anchored in any way.

FIG. 6 is a view similar to FIG. 5 showing the fence bolted to the concrete apron.

FIG. 7 is a view similar to FIG. 5 showing the fence held in place by weights to provide resistance to tipping and sliding.

FIG. 8 is a cross sectional view of the fence indicating somewhat the turbulence created within the fence by that portion of the blast which enters the fence through the perforations therein.

FIG. 9 is a perspective view showing a different configuration consisting of primarily solid type modular panel units that offers blast protection from one direction only.

FIG. 10 is a top view of the "one-way" fence in FIG. 9, showing a method of attaching the rear supports.

FIG. 11 is a perspective view showing an arrangement similar to that shown in FIG. 9, except a screen has been added to prevent objects from being blown up over the fence.

FIG. 12 is a view taken through section 12—12, in FIG. 11.

FIG. 13 is a perspective view of an arrangement which provides "two-way" protection and also includes screens which serve to catch objects which might otherwise be blown up and over the fence from either of two opposite directions.

FIG. 14 is a perspective view of one of the fence panel units which has a series of forwardly inclined flaps, die cut from the web portion of the units.

FIG. 15 is an enlarged view of two of the flaps shown in FIG. 14.

FIG. 16 is a view of an alternative configuration of said flaps.

FIG. 17 is a view of still another configuration of said flaps.

This application is a continuation-in-part of my previously filed application Serial Number 729,415, filed April 18, 1958, and abandoned July 29, 1959, upon Engine Blast Absorbing Fence.

Referring now to FIGURES 1 to 8 of the drawings, 10 indicates a portion of an airport terminal building or finger, adjacent to which aircraft are moved for loading or unloading. Passengers in passing from the building to the aircraft must traverse the apron therebetween, and utmost precaution must be taken to prevent passengers from getting behind the aircraft in the path of the exhaust blast therefrom. To this end the blast fence 12, which is the subject of my invention, is shown as located behind and at right angles to the axis of the exhaust blast, and also substantially at right angles to the wall of the terminal building. The fence is about 100 feet or so behind the plane, and thus another jet plane could be brought to the same terminal building immediately behind the fence 12. As will be explained hereinafter, in this particular configuration the fence effectively breaks up the blast by the turbulence of the air going through the perforations of the fence. That side of the fence nearest to the plane is referred to as the leading side of the fence.

The fence itself is of somewhat inverted V shape in end view or section, and is composed of two sides 14 and 16. Each side comprises a plurality of identical modular units such as indicated in FIGURE 3. Each unit is a single sheet of material, preferably metal, and is provided with side flanges 18 and 20 extending normal to the web portion 22.

These flanges provide considerable stiffness against bending due to the dead weight of the units and the force of the exhaust blast, and also provide a means for bolting or otherwise joining adjacent flanges of the units together in making a fence as long as desired. It will be noted too that the flanges 18 and 20 of opposite units overlap at the top and are bolted or otherwise secured together to hold the sides of the fence together. Stiffening members 30 span the space between flanges 20 and 18 of the opposite units and are secured at their ends thereto to form a rigid structure. As will be seen each unit, in the preferred form shown in FIG. 3, is bent on transverse lines 24 and 26 into three approximately equal areas, curving from the top downwardly and outwardly to the bottom, and all of which areas are perforated. Across the bottom area of each unit is a flange 28 providing a footing for the fence which may be anchored or weighted to hold the fence in place.

The entire areas of each unit are perforated with holes which I have shown as equally spaced from one another. I have also shown the perforations as being circular holes 30′, but it will be understood these perforations may be of any desired shape such as at 80 or 82 in FIGS. 14, 15, 16 and 17. The aggregate area of the openings may vary anywhere from near zero to 60% of the fence area, depending on individual circumstances and the type and power of the jet engines. The size, the shape and the density of the perforations are related, in any particular fence application, to several variables; i.e., the desired amount of visibility through the fence; the desired amount of protection from the blast on the lee side of the fence; and the intensity and frequency of the applied blasts. One perforation arrangement which has been found to produce a fair compromise in satisfying these variables consists of 1½″ diameter round holes on 3″ centers in both front and rear modular units of a two-sided fence.

In an application where a blast of high intensity will come from one direction only, it has been found that a nearly solid modular unit is preferable.

On the other hand, in an application such as in peripheral fencing about an air field where a larger degree of visibility through the fence is desirable, but protection in the area adjacent the rear of the fence is not so important, the modular units will be provided with perforations, the diameters of which are larger than 1½″ and the aggregate area of such perforations will approximate 60% of the total fence area.

The respective lower edges of the flanges 18 and 20 are bias cut so that when in upright position said edges are in plane with the ground. Flanges 28 are formed at an angle to the bottom area of the units so as to be in plane with the ground also.

If the force of the blast is not too great, the completely assembled fence, as indicated in FIGS. 2 and 5, may be of sufficient weight resting on the apron to withstand the force of the blast without being anchored in any way.

However, in all probability it will be desirable that the fence be anchored. In FIG. 6 I have shown anchor bolts 32 extending through the flanges 28 into the concrete apron to securely hold the fence in place.

If it is desired that the fence be more or less readily portable or at least movable, I have shown in FIG. 7 weights 34 as being placed on the flanges 28 to thereby hold the fence in place. The flanges 28 may also be perforated to provide a rough, anti-slip undersurface, or to serve as holes for anchor bolts if these are employed.

In the two-way fence configuration in FIGS. 1, 2, and 5, 6, 7, the two perforated sides of the fence are inclined toward each other upwardly as indicated, and are positioned transversely of the blast from a jet engine, in which case they both deflect and absorb the air blast and greatly reduce the objectionable characteristics of air blasts from jet and propeller driven planes. An air stream impinging on the perforated sloped surface of the fence is partly passed through the holes and is partly deflected upwardly as indicated in FIGURE 8. The air going through the perforations in the fence enters the inner space with considerable turbulence and introduces higher than atmospheric pressure in said space. The forward velocity of the air in this inner space is thus greatly hampered and dissipated by cross flows and eddies resulting in a gradual lateral spreading out and dissipation of the blast elements so that only a mild flow exists along and within the length of the fence.

A fence of this design has an interior which is completely clear, providing easy access for assembly, maintenance and cleaning. It is also symmetrical and functions equally well from either side. Thus, two jets could be placed back to back with the fence in between to absorb the blasts from both planes simultaneously. Both sides of the fence being perforated, there is at least some degree of visibility through the fence, which is an advantage since the top of the fence is above eye level. This type of fence will also provide a partial sound barrier to the loud noise inherent in the air stream blast and the engine noise, particularly with respect to the high frequency sound waves emanating from the jet engine compressors. This is the most irritating noise to the human ear. The reduction in noise level as measured in decibels in quite remarkable, reductions up to 16 decibels being obtained in the higher frequency range when the fence is 100 feet behind the planes. It is possible that an even sharper cut-off could be achieved by the use of smaller holes. The optimum, of course, would be that which gave the greatest blast deflection and absorption and the greatest decibel reduction.

I have shown and described the openings as being of the same size and equally spaced from each other throughout the area of the sides of the fence. This, in all probability, is the most economical form to manufacture. In a typical air terminal installation, the fence would be about seven feet high and the center of the blast from an engine exhaust would probably engage the fence somewhere about midway between the top and bottom of the fence. Since the engine exhaust blast spreads outwardly in conical fashion, the blast stream velocity will be substantially uniform over the height of the fence. It may be desirable, therefore, to have the longitudinal central area of the fence provided with an average number of like openings, and to have the lower and upper longitudinal areas of the fence provided with more than average and less than average number of holes respectively. In this way each unit area of the fence will have the same amount of open area in projection on a vertical plane and will therefore admit substantially the same amount of air. This will distribute the turbulence more evenly within the inner space of the fence and more effectively dissipate the force and sound of the blast.

In FIGURE 4 I have shown a slightly modified form of fence unit which comprises a single sheet of material, having side flanges 40 and 42 and a web portion 44 extending between the flanges. The web portion is perforated as in the other modification and is provided with a base flange 46. The only difference between this modification of unit and that shown in FIGURE 3 is that the unit is slightly curved from end to end as shown instead of being bent on two lines to provide a web of three like flat areas. Functionally, a fence made up of a plurality of either unit would be as effective as a fence made up of a plurality of the other unit.

Referring now to the modification shown in FIGURES 9 and 10, 50 indicates one of the basic modular units, several of which are arranged side by side in a configuration designed to protect against blasts approaching from one direction only. This is in contrast to the symmetrical "two-way" blast configuration previously described which employs like panel units inclined toward each other. The abutting flanges of adjacent units are secured together as in the previously described modification. The thus assembled fence is held in upright position by struts 51 and 52, the upper end of each of which is secured to side flanges of the units 50, and the other ends of which struts are secured to angle iron or other shoes 56, thus forming triangular supports for each of the modular units. Since this is a one way fence, the perforations are either fewer in number, smaller in size, or even completely eliminated except for a few openings near the bottom, as otherwise an excessive portion of the blast would pass through and cause undesirable turbulence and heat behind the fence. A few holes are necessary in any case, since at least a small portion of the blast must be allowed to pass through the fence to neutralize a vacuum condition which otherwise would be created by the main portion of the flow passing up and over the fence. Each of the modulator units has a base flange 55, resting upon the ground and provided with holes 54, through one of which an anchoring bolt or the like may pass to hold the fence in position. Similar anchoring means may be used to secure the shoes 56 in place.

It has been demonstrated that when these fences are used transversely of the blast of jet aircraft, any debris that may be in the path of said blast is blown up and over the fence. This could be very damaging and cause injury to persons at the other side of the fence. To prevent such, I have shown in FIGS. 11 and 12 configurations which are only slight modifications to the basic fence previously described. Here, screens are provided to catch any debris that may be blown up the fence, and which, otherwise, would be carried over the fence. An opening 60 is provided through each unit adjacent a side flange thereof at a lower corner of the top web area of the unit. Through these openings 60 are passed strap arms 58 which extend rearwardly to the strut 51 and are there secured by fastening means indicated at 59. Arms 58 extend forwardly of the fence a short distance, and to the under side of said arms is secured a screen baffle 57. Thus any debris blown up the fence will be trapped at the juncture of the baffle and fence. When the plane moves so that the fence is no longer in the path of the jet blast, such debris will fall to the ground at the base of the fence and may be easily picked up and carried away.

The structure shown in FIGURE 13 illustrates the application of screens, such as shown in FIGURE 11, to a two-way fence structure which may be positioned between a pair of jet aircraft transversely of the exhaust blast therefrom. In FIGURE 13 the two-way fence is substantially identical to the structure shown in FIGURES 1 to 8 with the addition thereto of two of the screen units illustrated and described in connection with FIG. 11. The only difference is that the strap arms 78 of FIG. 13 extend through the openings 70 in the webs of the modular units and are secured to the side flanges of the modular units of the other side of the fence as at 63. Screens 67 are attached to the arms 78 on each side of the fence so as to catch and trap any debris blown up either side of the fence.

The fence of FIGURE 13 is anchored to the airport apron in exactly the same manner as that of the first described modification. In fact, the only difference between the first described modification and FIGURE 13 is in the addition of the screens.

It may be desirable to provide some rather large holes or openings through the modular units immediately under the juncture of the screens and web of the units so that any debris which is blown up the fence to the screen will be directed inwardly through these openings and fall to the ground within the confines of the fence interior. Because of the mild air flow condition inside the fence, this debris will continue to collect and can be periodically cleaned up.

As previously stated, the openings in the modular units can be any of many types or configurations. Probably the most convenient are the round punched holes as indicated. However, in the one-way fence it is possible that the blast to be deflected will only be of a mild nature. In such a case the desirable feature of being able to see through the fence can be incorporated by providing a lesser number of perforations as compared to the more dense pattern used in the "two-way" fence panels. Such a moderately perforated panel is shown in FIG. 14 wherein the web portion of the modular units is provided with a plurality of die-cut rectangular flaps 85, being cut from the body of the web portion across the top and sides of each flap and bent outwardly along the base of the flap. This construction provides means for a degree of visibility through the fence and also allows some air from the blast to pass therethrough.

In FIGURE 16, the upper end of the flap is shown as curled outwardly as at 86, and in FIGURE 17, the sides of the flap are curled outwardly. These modifications are to indicate that the particular manner in which the perforations are formed is of no special moment. But it is important that perforations of some sort be provided.

From the foregoing it will be seen that I have provided by this invention a blast fence capable of being erected in several modifications at airports, and which is composed of a plurality of identical units, each comprising a single sheet of material formed with side and bottom flanges to provide inherent strength and good fastening which is effective for the purpose intended, and which may be quickly and economically assembled and disassembled.

I claim:

1. A ground supported blast fence for use transversely of the exhaust blast from the engine of an airplane, comprising a plurality of like modular units, each unit comprising a single sheet of material and providing its own stiffness against flexure caused by the blast loading by being formed with a single continuous rectangular web portion, said sheet being bent along the side edges of said web portion to form integral flanges extending in one direction normal to said web portion, said sheet being bent along its bottom edge to form a base supporting flange, means for attaching the side flanges of adjacent units together to form a continuous blast fence, each sheet serving as its own supporting frame partially for itself and partially for adjacent units, the web portion of each unit curving outwardly and downwardly and being perforated, whereby a portion of the blast from a jet engine may enter the perforations and a portion of said blast is directed upwardly, and means for supporting the assembled fence in inclined position with the base supporting flange extending toward the approaching blast.

2. A blast fence according to claim 1 wherein the web portion of said units is divided into a plurality of flat areas at an angle to each other by being bent along spaced parallel transverse lines.

3. A blast fence according to claim 1, wherein the bottom flange extends in a direction opposite to that of the side flanges.

4. A ground supported blast fence for use transversely of the exhaust blast from the engine of an airplane, comprising flat sheets of material assembled in inclined relation toward each other to form a fence of inverted V-shape in cross section, said fence being formed of a plurality of like unitary modular units secured together along adjacent margins to form a continuous fence of any desired length, each unit being uniformly perforated so that some vectors of a concentrated blast will pass through perforations in the leading side of the fence and be redistributed inside and along the fence to reduce said vectors to mild flow and other vectors will be deflected upwardly and over the fence, and means for supporting the fence in upright position.

5. A blast fence according to claim 4, wherein the aggregate area of the perforations comprise about 50% of the area of units providing means whereby the vectors passing through the perforations in the leading side of the fence meet each other and become highly turbulent and introduce a higher than atmospheric pressure within the fence, resulting in a gradual lateral spreading out and dissipation of the blast elements along and within the length of the fence.

6. A blast fence according to claim 4, wherein the perforations are controlled in size and frequency to approximately 1½ inch diameter on 3 inch centers so that that portion of the blast entering said perforations will have its velocity energy greatly dissipated within the two inclined sides of the fence.

7. A ground supported blast fence for use transversely of the exhaust blast from the engine of an airplane, comprising a pair of sides inclined toward each other and secured together along their upper edges to form a fence of inverted V-shape in cross section, each of said sides comprising a plurality of like modular units secured together along adjacent margins to form a continuous fence, each unit being curved downwardly and outwardly and perforated whereby some vectors of a blast will pass through perforations in the leading side of the fence and be redistributed inside and along the fence to reduce said vectors to mild flow and other vectors of the blast will be deflected upwardly and over the fence, and means for supporting the fence in position.

8. A blast fence according to claim 7, wherein each unit is formed of a single sheet of material bent along opposite sides to form flanges and the meeting flanges of adjacent units being secured together, and the perforations are of approximately 1½ inch diameter on 3 inch centers to effectively reduce noise level.

9. A blast deflecting fence adapted to be installed on a ground area transversely of the exhaust blast of an aircraft engine, comprising a plurality of like modular units, each unit comprising a single sheet of material providing its own stiffness against flexure caused by the blast loading by being formed with a single continuous web portion and with integral flanges formed along the side edges of the web portion and extending in a direction normal to the web portion, means for attaching adjacent flanges together to form a continuous fence, each unit serving as its own supporting frame partially for itself and partially for adjacent units, each unit having a leading ground engaging edge and a rear edge at a substantial elevation, the web portion extending at an incline between said edges, and a perforated baffle extending at an angle to the units which will permit the passage of blast air but which will trap any debris that may be blown up the fence by the blast.

References Cited in the file of this patent

UNITED STATES PATENTS

| | | |
|---|---|---|
| 1,026,806 | Iblings | May 21, 1912 |
| 2,646,257 | Krume | July 21, 1953 |
| 2,683,002 | Adams et al. | July 6, 1954 |
| 2,726,830 | Brown et al. | Dec. 13, 1955 |
| 2,803,437 | Borges | Aug. 20, 1957 |
| 2,826,382 | Hayden | Mar. 11, 1958 |
| 2,936,040 | Rennard | May 10, 1960 |
| 2,974,910 | Lynn | Mar. 14, 1961 |

OTHER REFERENCES

Aviation Week, volume 63, No. 10, Sept. 5, 1955, page 28.

Popular Science, page 102, September 1952.